United States Patent
Jeon et al.

(10) Patent No.: US 9,481,322 B2
(45) Date of Patent: Nov. 1, 2016

(54) STRUCTURE OF DOOR TRIM AND DOOR INNER BELT FOR VEHICLE

(71) Applicant: HYUNDAI MOTOR COMPANY, Seoul (KR)

(72) Inventors: Dongmin Jeon, Hwaseong-si (KR); Dongmin Bae, Hwaseong-si (KR); Jongwon Lee, Seoul (KR); Hyungsik Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/705,820

(22) Filed: May 6, 2015

(65) Prior Publication Data

US 2016/0144803 A1 May 26, 2016

(30) Foreign Application Priority Data

Nov. 25, 2014 (KR) .......................... 10-2014-0165180

(51) Int. Cl.
*B60R 13/02* (2006.01)
*B60J 10/00* (2016.01)

(52) U.S. Cl.
CPC ............ *B60R 13/0243* (2013.01); *B60J 10/00* (2013.01)

(58) Field of Classification Search
CPC .. B60J 10/041; B60J 10/042; B60R 13/0243
USPC ................... 296/146.2, 146.3, 146.7; 49/502
See application file for complete search history.

(56) References Cited

U.S. PATENT DOCUMENTS

| 5,855,094 A * | 1/1999 | Baudisch ............... B60J 5/0412 49/348 |
| 6,123,385 A * | 9/2000 | Bailey .................... B60J 5/0416 296/146.7 |
| 7,159,926 B2 * | 1/2007 | Ward .................. B60R 13/0206 296/1.08 |
| 7,784,824 B2 * | 8/2010 | Sato ....................... B60R 21/21 280/728.2 |
| 2004/0094989 A1 * | 5/2004 | Matsumoto ......... B60R 13/0206 296/146.1 |
| 2007/0046000 A1 * | 3/2007 | Sato .................... B60R 13/0243 280/730.2 |
| 2013/0031842 A1 * | 2/2013 | Murree .................. B60J 10/041 49/492.1 |
| 2013/0320705 A1 * | 12/2013 | Okada .................. B60J 10/0091 296/146.2 |
| 2014/0117704 A1 * | 5/2014 | Ide ...................... B60J 10/0094 296/146.2 |

FOREIGN PATENT DOCUMENTS

JP          05-065022 B2    10/2012
KR      10-0812450 B1     3/2008

* cited by examiner

*Primary Examiner* — Jason S Morrow
(74) *Attorney, Agent, or Firm* — McDermott Will & Emery LLP

(57) ABSTRACT

A structure of a door trim and a door inner belt including a door trim mounted to an inner side of a vehicle door to form an interior space of the door together with a door outer panel. A trim inner rail is fixedly mounted to the door trim in the interior space of the door and has a hollow polygon shape. A door inner belt includes at least one contact rib extending in a width direction of a vehicle toward and to be in contact with a door glass. A coupling portion extends in the opposite direction of the at least one contact rib and coupled to at least one of the door trim and the trim inner rail.

5 Claims, 3 Drawing Sheets

STRUCTURE OF DOOR TRIM AND DOOR INNER BELT FOR VEHICLE

CROSS-REFERENCE TO RELATED APPLICATION

The present application claims the benefit of priority to Korean Patent Application Number 10-2014-0165180 filed on Nov. 25, 2014, the entire content of which application is incorporated herein for all purposes by this reference.

TECHNICAL FIELD

The present disclosure relates to a structure of a vehicle door. More particularly, the present disclosure relates to a structure of a door trim and a door inner belt for a vehicle capable of securing assemblability and stiffness, and reducing noise and the number of components of a vehicle door.

BACKGROUND

A vehicle door has a door trim for covering a door panel. The vehicle door trim includes, depending on a structure thereof, a wide and flat door trim attached to a door panel and a molded door trim having an arm rest or the like molded as one unit with the door trim. The door trim is used only to provide an aesthetic effect for a vehicle interior but also to provide sound insulation, sound absorption, protection of occupants at the time of crash, etc.

The vehicle door further includes a door inner belt having at least one contact rib formed thereon, which is in contact with door glass, supports the door glass from an inner side, and guides up/down movement of the door glass.

In addition, different frame members are installed on the vehicle door depending on the formation of an inner space of the door. A frame door has a relatively large width, and a slim door has less frame members to further secure the inner space.

FIG. 1 illustrates a cross-sectional view of a door frame according to the related art.

Referring to FIG. 1, a door frame of the related art has four structures including an outer panel, an outer rail, an inner panel, and an inner rail which are welded together to secure an inner space of a door.

A slim door has been used from which the outer rail and a door glass arranged inside a vehicle in a width direction of the inner panel are eliminated for further securing the inner space.

For example, as a door inner panel in FIG. 1 replaces a function of a door outer rail, an existing door inner rail may be mounted to be closer to an inner side of the vehicle.

Moreover, as a trim seal for controlling the amount of water entering along a door glass surface is attached to an inner side of the vehicle in a width direction of the door inner rail, of which a position and a shape are changed, watertight performance may be improved since the trim seal may extend up to an upper side of the door trim as shown FIG. 1.

However, even if the door inner rail is eliminated according to the related art, assemblability and stiffness of the door inner belt need to be improved.

Further, buzz, squeak, and rattle (BSR) of the vehicle door, which causes due to the assembly structure of the door trim and the door inner rail, particularly, when a supporting structure of the door trim and the door inner belt in a width direction of the door is not adequately strong, also needs to be improved.

Moreover, if the door inner rail can be fabricated by roll molding rather than by press molding, stiffness of the structure may be improved and cost may be saved.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a structure of a door trim and a door inner belt in a vehicle capable of securing assemblability and stiffness, improving a problem of BSR, and reducing the number of components of a vehicle door.

According to an exemplary embodiment of the present inventive concept, a structure of a door trim and a door inner belt includes a door trim mounted to an inner side of a vehicle door to form an interior space of the door together with a door outer panel. A trim inner rail is fixedly mounted to the door trim in the interior space of the door and has a hollow polygon shape. A door inner belt includes at least one contact rib formed at one side of the door inner belt and extending in a width direction of a vehicle toward and to be in contact with a door glass. A coupling portion is formed at another side of the door inner belt extends in the opposite direction of the at least one contact rib and coupled to at least one of the door trim and the trim inner rail.

The trim inner rail may include an insert portion inserted in an insert recess formed in an upper side of the door trim in a height direction of the vehicle.

The coupling portion of the door inner belt may extend in the width direction of the vehicle to form an inner fitting space formed which is continuous in a length direction of the vehicle in the coupling portion. The trim inner rail may include a fitting portion extending toward the door glass in the width direction of the vehicle and disposed inside the inner fitting space. The door trim may have an L surface formed in a height direction of the vehicle. The trim inner rail may have a contact surface formed parallel to the L surface. The contact surface may be fixedly coupled to the L surface.

The trim inner rail may restrict movement of the door inner belt in the width direction of the vehicle, a length direction of the vehicle, and a height direction of the vehicle.

The contact surface and the L surface may be fixedly coupled by an inserting clip.

DETAILED DESCRIPTION

Figure 1:
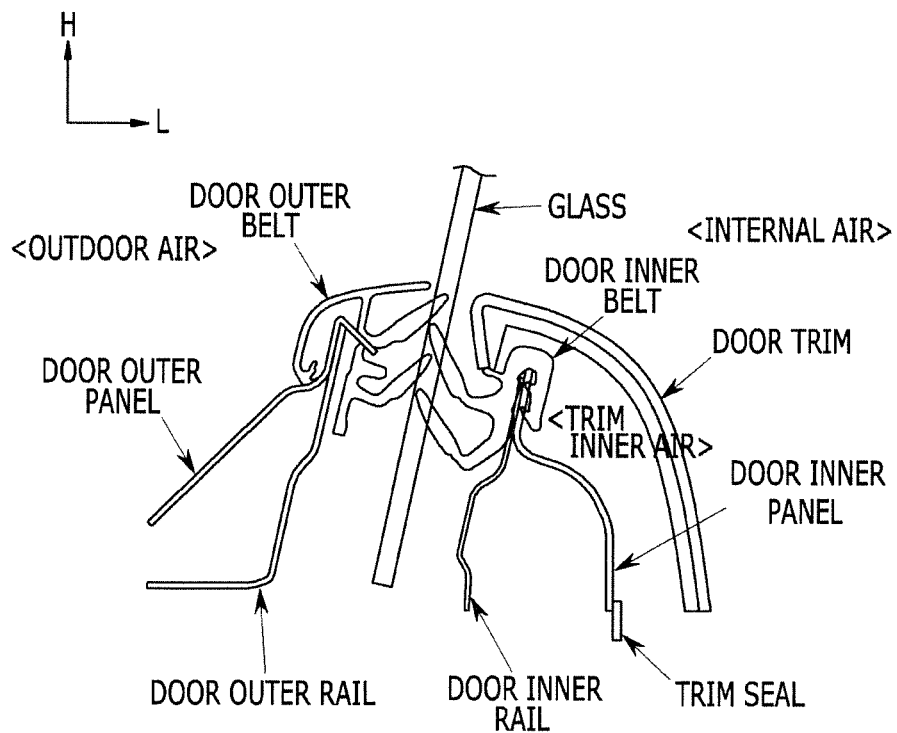
FIG. 1 illustrates a cross-sectional view of a related art door frame.

Hereafter, an exemplary embodiment of the present inventive concept will be described with reference to the accompanying drawings such that persons skilled in this field of art can easily carry it out.

Since the exemplary embodiment, being one of embodiment of the present inventive concept, may be embodied by persons skilled in this field of art in different modes, the scope of the present inventive concept will not be limited to the exemplary embodiment described hereafter.

Throughout the specification, unless explicitly described to the contrary, the word "comprise" and variations such as "comprises" or "comprising" will be understood to imply the inclusion of stated elements but not the exclusion of any other elements.

Further, terms of constituent elements will not limit functions of the constituent elements.

In the drawings, T denotes a length direction of a vehicle, L denotes a width direction of the vehicle, and H denotes a height direction of the vehicle.

Figure 2:
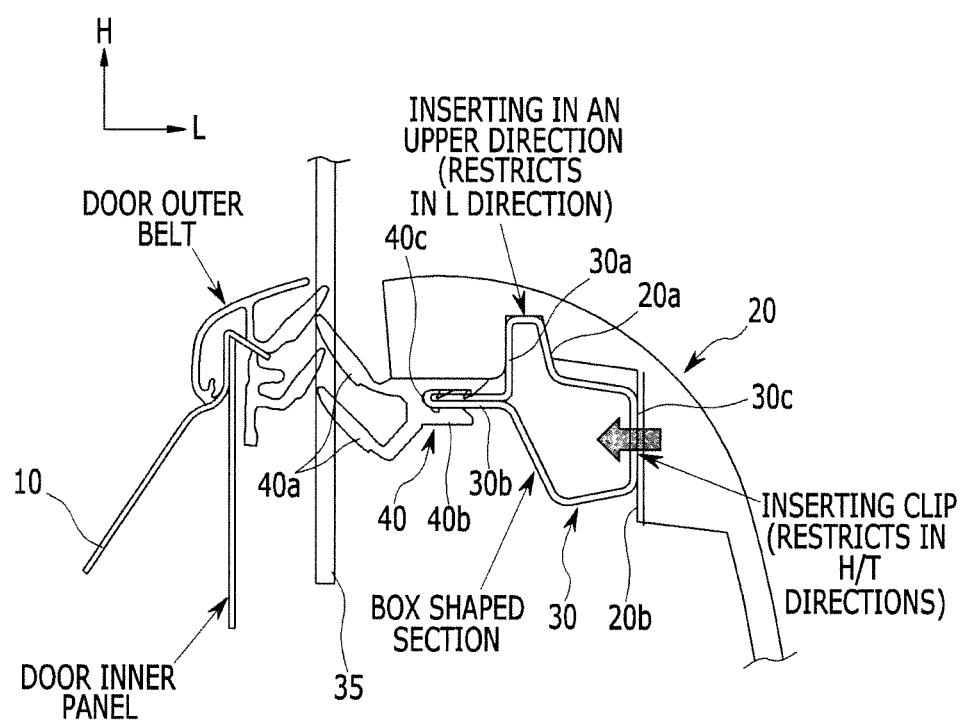
FIG. 2 illustrates a cross-sectional view of a door having a structure of a door trim and a door inner belt in accordance with an embodiment of the present inventive concept.

FIG. 2 illustrates a cross-sectional view of a door having a structure of a door trim and a door inner belt in accordance with an exemplary embodiment of the present inventive concept.

Referring to FIG. 2, a structure of a door trim and a door inner belt in accordance with the present disclosure may include a door trim 20 mounted to an inner side of a vehicle door to define an interior space of the door together with a door outer panel 10. A trim inner rail 30 has a hollow polygon shape and is fixedly mounted to the door trim 20. A door inner belt 40 has at least one contact rib 40a formed in a width direction of a vehicle at one side of the door inner belt and extending towards and to be in contact with a door glass 35. A coupling portion 40b is formed at another side of the door inner belt 40 in the width direction and extends in the opposite direction of the at least one contact rib to be coupled to at least one of the door trim 20 and the trim inner rail 30.

In the present disclosure, the coupling portion 40b of the door inner belt 40 couples to the trim inner rail 30 which functions as the door inner rail of the related art to achieve the structure of the door inner belt.

However, the embodiment of the present inventive concept is not limited to this, and the coupling portion 40b may couple to both of the trim inner rail 30 and the door trim 20.

Since coupling of the coupling portion 40b to the door trim 20 is well known to persons skilled in this field of art, detailed description thereof will be omitted.

In the structure in accordance with an exemplary embodiment of the present inventive concept, the door inner panel replaces the door outer panel of the related art (See FIG. 1) and the trim inner rail 30 replaces the door inner rail of the related art (See FIG. 1), and thus, improves stiffness substantially compared to a thin panel structure. Here, the trim inner rail 30 may be fabricated by roll molding, instead of press molding.

In addition, in comparison to the related art as shown in FIG. 1, the structure according to the present disclosure has the door outer rail eliminated therefrom.

The trim inner rail 30 may include an insert portion 30a inserted in an insert recess 20a formed in an upper side of the door trim 20 in a vehicle height direction. Referring to FIG. 2, the insert portion 30a restricts L direction displacement of the door inner belt 40.

The coupling portion 40b of the door inner belt 40 has an inner fitting space 40c formed therein in the width direction of the vehicle, and a fitting portion 30b extending in the width direction of the vehicle toward the door glass 35 from an outer side of the trim inner rail 30 in the width direction.

Further, by inserting protrusions (no reference numeral) formed on the inner fitting space 40c in holes (not shown) which is additionally formed in the fitting portion 30b, the L direction displacement may be additionally restricted and the coupling may be reinforced.

The door trim 20 may have an L surface 20b formed perpendicular or substantially perpendicular to the width direction thereon. The trim inner rail 30 may have a contact surface 30c formed parallel to the L surface 20b, and the contact surface 30c may be fixedly coupled to the L surface 20b. Here, an inserting clip may be used for coupling.

With these, movements of the trim inner rail 30 in the length and height directions may be restricted. The trim inner rail 30 may restrict displacements of the door inner belt 40 in the width, length, and height directions.

Figure 3:
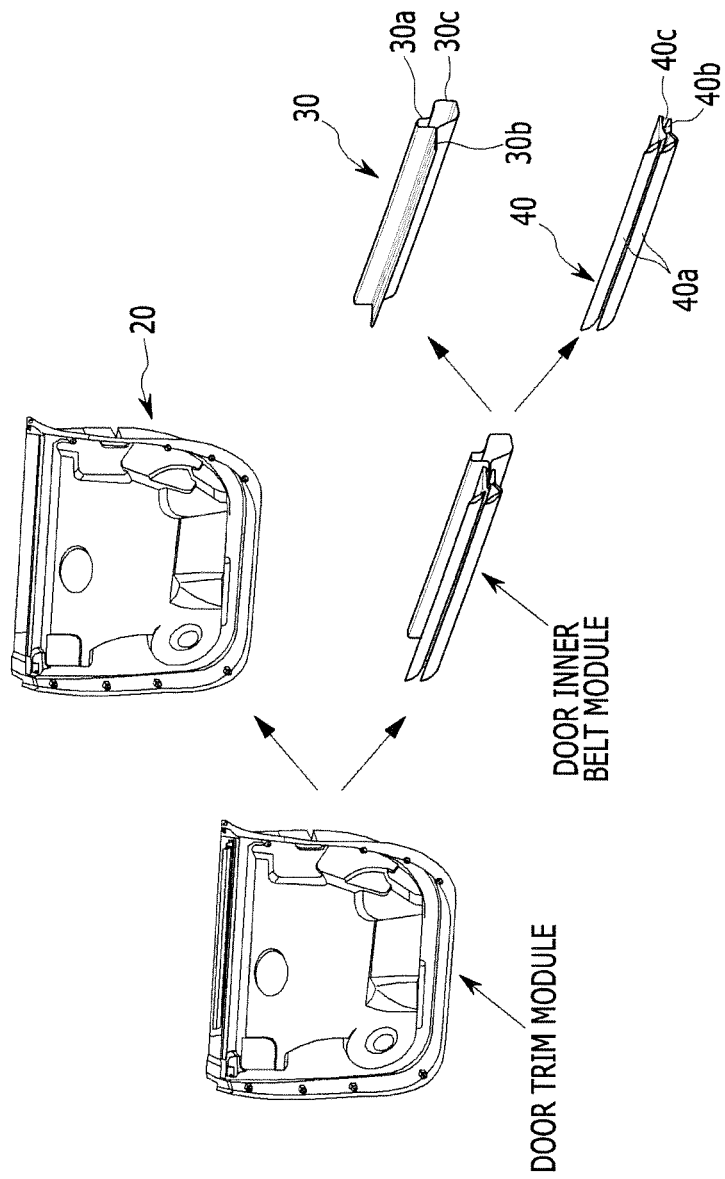
FIG. 3 illustrates an exploded perspective view of a structure of a door trim and a door inner belt in accordance with an embodiment of the present inventive concept.

FIG. 3 illustrates an exploded perspective view of a structure of a door trim and a door inner belt in accordance with an exemplary embodiment of the present inventive concept.

Referring to FIG. 3, a process of inserting and assembling the trim inner rail 30 and the door inner belt 40, and a process of assembling the door inner belt module and the door trim 20 are illustrated.

A structure of a door trim and a door inner belt according to the present disclosure secure assemblability and stiffness, improve BSR noise of a vehicle door, and reduce the number of components.

Further, press molding can be replaced with roll molding, thus reducing cost.

While this inventive concept has been described in connection with what is presently considered to be practical exemplary embodiments, it is to be understood that the inventive concept is not limited to the disclosed embodiments, but on the contrary, is intended to cover various modifications and equivalent arrangements included within the spirit and scope of the appended claims.

What is claimed is:

1. A structure of a door trim and a door inner belt, comprising:
    a door trim mounted to an inner side of a vehicle door and to form an interior space of the door together with a door outer panel;
    a trim inner rail fixedly mounted to the door trim in the interior space of the door and having a hollow polygon shape; and
    a door inner belt including at least one contact rib formed at one side of the door inner belt and extending in a width direction of a vehicle toward and to be in contact with a door glass, and a coupling portion formed at another side of the door inner belt and extending in the opposite direction of the at least one contact rib to be coupled to at least one of the door trim and the trim inner rail,
    wherein the trim inner rail includes an insert portion inserted in an insert recess formed in an upper side of the door trim in a height direction of the vehicle.

2. The structure of claim 1, wherein
    the coupling portion of the door inner belt extends in the width direction to form an inner fitting space which is continuous in a length direction of the vehicle in the coupling portion, and
    the trim inner rail includes a fitting portion extending toward the door glass in the width direction of the vehicle and disposed inside the inner fitting space.

3. The structure of claim 1, wherein
    the door trim has an L surface formed in the height direction,
    the trim inner rail has a contact surface formed parallel to the L surface, and
    the contact surface and the L surface are fixedly coupled.

4. The structure of claim 1, wherein the trim inner rail restricts movements of the door inner belt in the width direction, a length direction of the vehicle, and the height direction of the vehicle.

5. The structure of claim 3, wherein the contact surface and the L surface are coupled by an inserting clip.

* * * * *